(12) United States Patent
Soares et al.

(10) Patent No.: US 8,766,588 B2
(45) Date of Patent: Jul. 1, 2014

(54) RATE LIMITED COMMON MODE CONTROL FOR PULSE-WIDTH MODULATION DRIVES

(75) Inventors: Manoel Soares, Natick, MA (US); Michael Nussbaum, Newton, MA (US)

(73) Assignee: Bose Corporation, Framingham, MA (US)

( * ) Notice: Subject to any disclaimer, the term of this patent is extended or adjusted under 35 U.S.C. 154(b) by 589 days.

(21) Appl. No.: 13/075,376

(22) Filed: Mar. 30, 2011

(65) Prior Publication Data
US 2012/0249046 A1   Oct. 4, 2012

(51) Int. Cl.
*H02P 23/00* (2006.01)
(52) U.S. Cl.
USPC ........... 318/811; 318/727; 318/767; 318/807; 318/810
(58) Field of Classification Search
CPC ......... H02P 23/00; H02P 27/08; H02P 21/06; H02P 25/04; G06F 9/466; G06F 9/30087
USPC ........................... 318/727, 767, 807, 810, 811
See application file for complete search history.

(56) References Cited

U.S. PATENT DOCUMENTS

| | | | |
|---|---|---|---|
| 5,699,240 A | 12/1997 | Obayashi | |
| 5,706,186 A | 1/1998 | Blasko | |
| 5,757,636 A | 5/1998 | Fletcher | |
| 5,990,657 A | 11/1999 | Masaki et al. | |
| 6,023,417 A * | 2/2000 | Hava et al. | 363/41 |
| 6,084,378 A | 7/2000 | Carobolante | |
| 6,324,085 B2 | 11/2001 | Kimura et al. | |
| 7,391,181 B2 | 6/2008 | Welchko | |
| 7,471,526 B2 | 12/2008 | Welchko | |
| 2005/0194925 A1 | 9/2005 | Ito et al. | |
| 2006/0119303 A1 | 6/2006 | Ho et al. | |
| 2007/0296364 A1* | 12/2007 | Shoemaker et al. | 318/561 |
| 2008/0116840 A1 | 5/2008 | Welchko | |
| 2009/0212733 A1* | 8/2009 | Hsieh et al. | 318/729 |
| 2012/0249043 A1* | 10/2012 | Soares | 318/722 |

FOREIGN PATENT DOCUMENTS

JP   2002209395   7/2002

* cited by examiner

*Primary Examiner* — Kawing Chan
(74) *Attorney, Agent, or Firm* — Occhiuti & Rohlicek LLP

(57) ABSTRACT

A method for pulse width modulation control of a multiple phase drive includes identifying at least one phase from the plurality of phases for the drive as eligible for clamping to one of a plurality of extreme power supply voltages, selecting a phase of the eligible phases having a largest magnitude driving current, determining a first offset signal as a difference between a control signal level for the selected phase and an extreme control signal level corresponding to one of the extreme power supply voltages, limiting a rate of change of the first offset signal to form a second offset signal, and determining a modified control signal for each of the phases for the drive including forming for each of a plurality of the phases a combination of the second offset signal and a control signal level for the phase to determine the modified control signal for the phase.

21 Claims, 19 Drawing Sheets

US 8,766,588 B2

RATE LIMITED COMMON MODE CONTROL FOR PULSE-WIDTH MODULATION DRIVES

BACKGROUND

This invention relates to rate limited common mode control for pulse-width modulation drives.

Many motor control applications make use of pulse-width modulated (PWM) voltages to drive a motor at various speeds. In some examples, motor control applications use a PWM controller in conjunction with a PWM inverter (e.g., a three phase inverter). The controller and inverter can be used to control both the voltage level and the frequency of the signals that are used to drive the motor.

A common method for generating pulse-width modulated voltages with a three-phase inverter bridge is to calculate duty-cycles $D_a$, $D_b$, and $D_c$ that are proportional to a set of commanded voltages $V_a$, $V_b$ and $V_c$. The duty-cycles are then sent to a circuit that controls the switches of the inverter.

Factors such as frequency and current magnitude directly affect power losses in PWM inverters. For example, a transition on a high current phase can dissipate substantial energy in the switching device (e.g., a transistor) during a transition between off and on states.

Switching losses can be reduced by reducing switching frequency or by reducing currents to be conducted. However, such reduction methods may not be sufficient in some applications. Thus, other methods for reducing switching losses are desirable.

In some examples, multiple phase control voltages are used to control motor speed, torque, or position in a feedback loop. Noise in the phase control voltages can cause the PWM controller to introduce unwanted, rapid switching of a common mode voltage as a consequence of some PWM algorithms. This unwanted switching can translate into unwanted switching of the PWM signals that are used to drive the motor. The power losses introduced by such unwanted switching can be significant. Thus, system designers may strive to reduce unwanted switching.

SUMMARY

In an aspect, in general, unwanted switching is inhibited by not discontinuing duty-cycles on phases with command voltages in close proximity to each other.

In an aspect, in general, a method for pulse width modulation control of a multiple phase drive includes identifying a set of at least one phase from the plurality of phases for the drive as eligible for clamping to one of a plurality of extreme power supply voltages, selecting a phase from the set of eligible phases having a largest magnitude driving current of the set of eligible phases, determining a first offset signal as a difference between a control signal level for the selected phase and an extreme control signal level corresponding to one of the plurality of extreme power supply voltages, limiting a rate of change of the first offset signal to form a second offset signal, and determining a modified control signal for each of the phases for the drive including forming for each of a plurality of the phases a combination of the second offset signal and a control signal level for the phase to determine the modified control signal for the phase.

Aspects may include one or more of the following features.

Identifying a set of at least one phase from the plurality of phases for the drive as eligible for clamping to one of a plurality of extreme power supply voltage may include applying a control-signal-level based test to a plurality of control signal levels corresponding to the plurality of phases for the drive to determine one or more phases to exclude from the set of at least one phase. The control-signal-level based test may include identifying one or more intermediate control signal levels of the plurality of control signal levels having signal levels between the maximum and the minimum control signal levels and excluding the phase corresponding to the one or more intermediate control signal levels from the set of at least one phase.

Selecting the phase from the set of eligible phases having the largest magnitude driving current of the set of eligible phases may include comparing a set of driving currents associated with the set of eligible phases, and determining the eligible phase with the largest magnitude driving current based on the comparison of the set of driving currents as the selected phase. The rate of change of the first offset signal may be limited according to a parameter determined from the plurality of control signal levels. The parameter may be formed as a magnitude of a control signal vector determined from the plurality of control signal values.

The rate of change of the first offset signal may be limited to a range between a first rate of change value and a second rate of change value. The rate of change of the first offset signal may be a monotonic function of the parameter. The rate of change of the first offset signal may be limited according to a parameter determined from the control signal levels. The parameter may be formed as a magnitude of a control signal vector determined from the plurality of control signal values, and the rate of change of the first offset signal may be a monotonic function of the parameter. Each pulse width modulated control signal of a plurality of pulse width modulated control signals may be determined according a corresponding one of the modified control signals of the plurality of phases.

In another aspect, in general, a multi-phase controller includes a control signal modifier. The control signal modifier includes an input for receiving a plurality of control signals, an input for receiving a plurality of drive currents, and an output for providing a plurality of modified control signals. The control signal modifier is configured to identify a set of at least one phase from the plurality of phases as eligible for clamping to one of a plurality of extreme power supply voltages, select a phase from the set of eligible phases having a largest magnitude driving current of the set of eligible phases, determine a first offset signal as a difference between a control signal level for the selected phase and an extreme control signal level corresponding to one of the plurality of extreme power supply voltages, limit a rate of change of the first offset signal to form a second offset signal, and determine a plurality of modified control signals, one for each of the phases for the drive including forming for each of a plurality of the phases a combination of the second offset signal and a control signal level for the phase to determine the modified control signal for the phase.

Aspects may include one or more of the following features.

A pulse width modulator may be configured to accept the plurality of modified control signals and determine each pulse width modulated control signal of a plurality of pulse width modulated control signals according to a corresponding one of the plurality of modified control signals. A control signal generator may, include an input for receiving a feedback signal, an input for receiving a command signal, an input for receiving a plurality of drive currents, and an output for providing a plurality of control signals. The control signal generator may be configured to determine the plurality of control signals in response to at least one of the feedback signal, the command signal, and the plurality of drive currents.

The control signal modifier may be configured to identify the set of at least one phase from the plurality of phases for the drive as eligible for clamping to one of a plurality of extreme power supply voltage including applying a control-signal-level based test to a plurality of control signal levels corresponding to the plurality of phases for the drive to determine one or more phases to exclude from the set of at least one phase. The control-signal-level based test may include identifying one or more intermediate control signal levels of the plurality of control signal levels having signal levels between the maximum and the minimum control signal levels and excluding the phase corresponding to the one or more intermediate control signal levels from the set of at least one phase.

The control signal modifier may be configured to select the phase from the set of eligible phases having the largest magnitude driving current of the set of eligible phases including comparing a set of driving currents associated with the set of eligible phases, determining the eligible phase with the largest magnitude driving current based on the comparison of the set of driving currents as the selected phase. The control signal modifier may include a slew rate limiter configured to accept a parameter determined from the plurality of control signal levels and limit the rate of change of the first offset signal according to the parameter. The parameter may be formed as a magnitude of a control signal vector determined from the plurality of control signal values.

The slew rate limiter may be configured to limit the rate of change of the first offset signal to a range between a first rate of change value and a second rate of change value. The rate of change of the first offset signal may be a monotonic function of the parameter.

Other features and advantages of the invention are apparent from the following description, and from the claims.

DESCRIPTION

1 Overview

Figure 1:
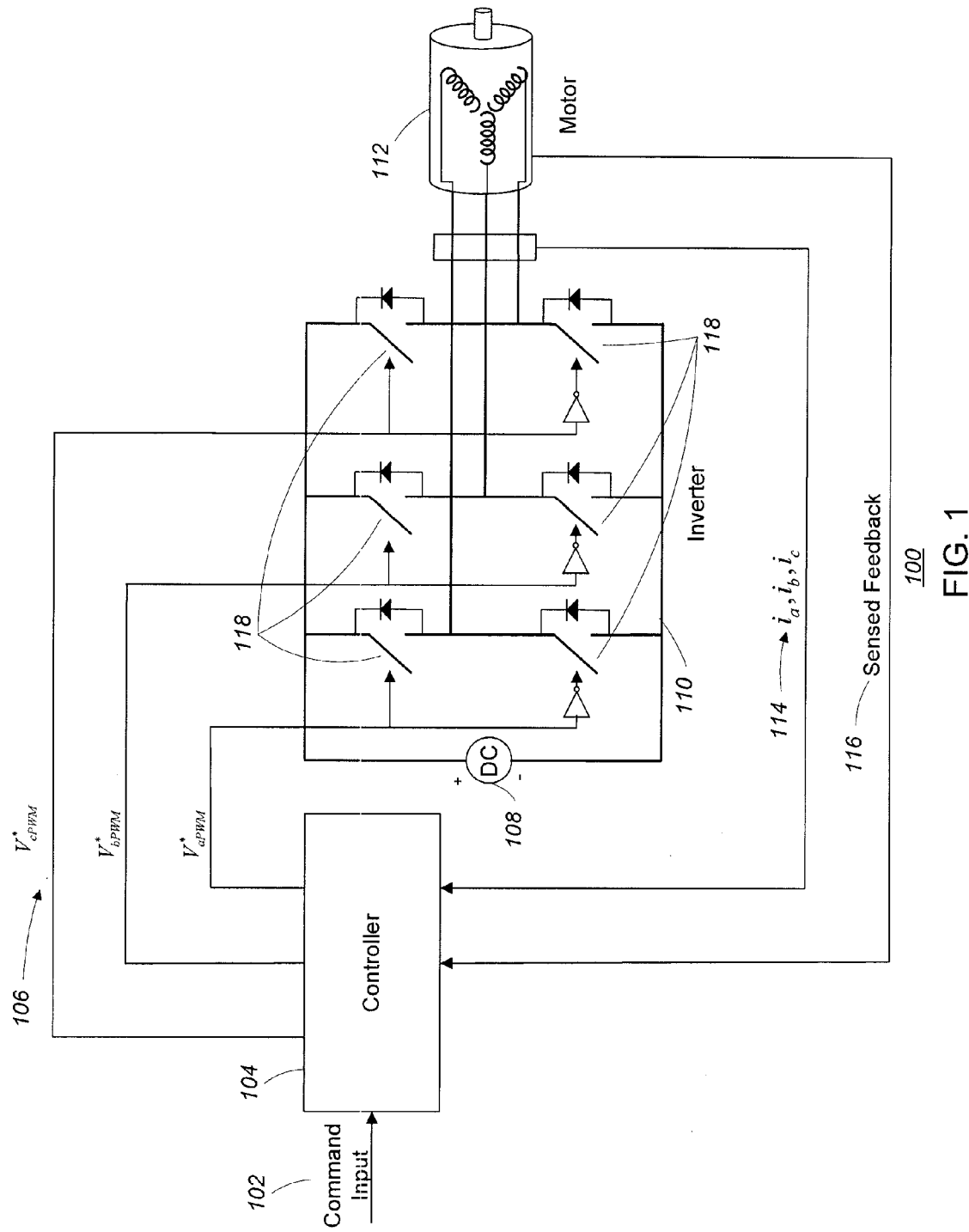
FIG. 1 is a block diagram of a three phase electric motor control system.
Figure 2:
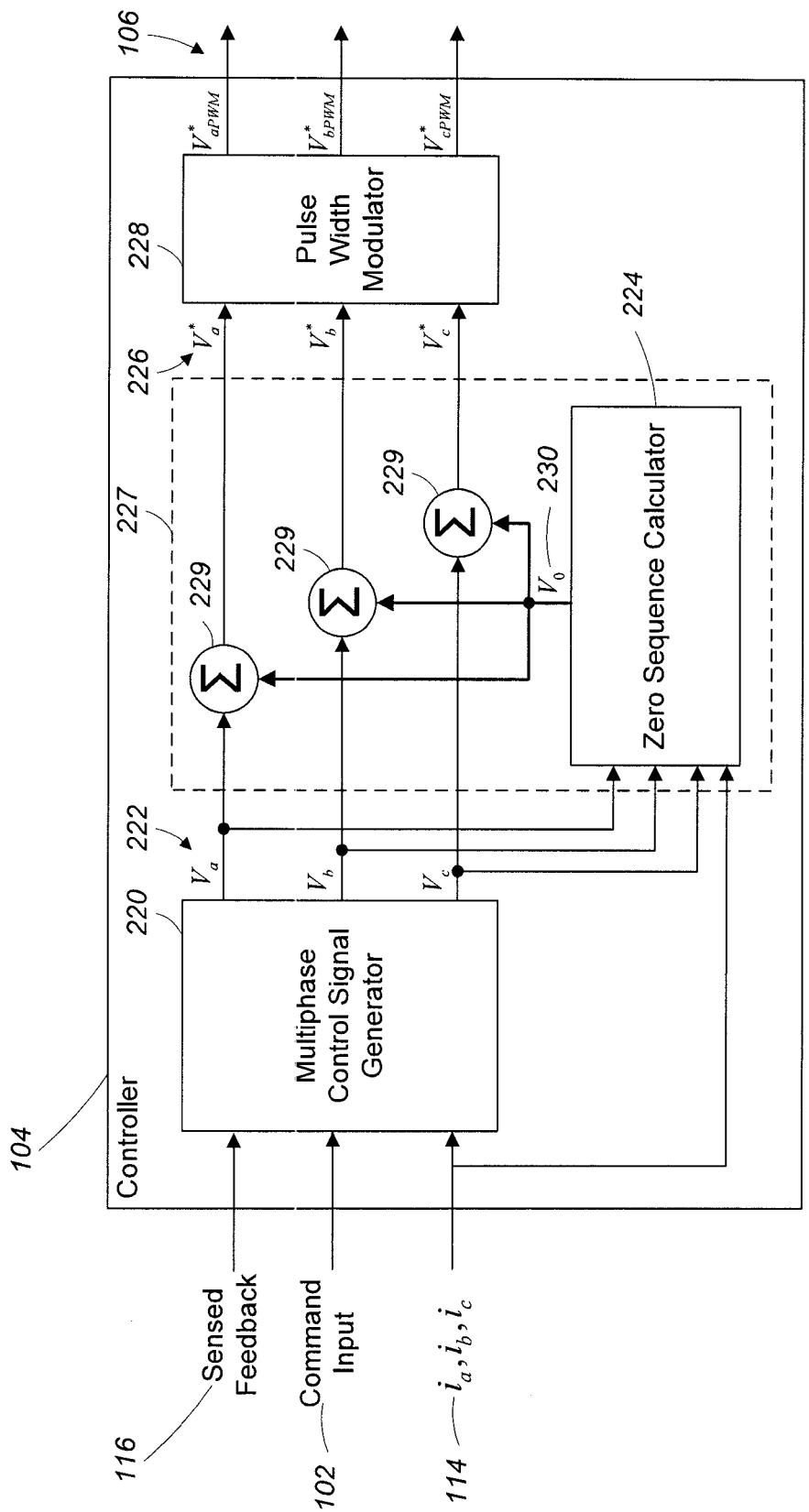
FIG. 2 is a block diagram of a three phase electric motor controller.

Referring to FIGS. 1 and 2, a typical discontinuous pulse width modulation (DPWM) three phase electric motor control system including a controller is presented.

As illustrated in FIG. 1, an embodiment of a three phase electric motor control system 100 is configured to reduce switching losses caused by rapid, unwanted switching. In general the system includes a controller 104, an inverter 110, and a three phase electric motor 112.

In some examples, the controller 104 receives various inputs and creates three pulse width modulated voltage commands 106, each corresponding to one of the phase inputs of the electric motor 112. The controller 104 determines the PWM voltage commands 106 in such a way that unwanted rapid transitions in the PWM voltage commands 106 are inhibited. A command 102 (e.g., a torque or position command) is input to the controller 104 from an external control system (not shown). The command 102 represents a desired output of the electric motor 112. Also input to the controller 104 are the set of measured currents on each of the phase inputs ("phase currents") 114, and a sensed feedback 116 (e.g., the sensed position of the motor 112). Based on the various inputs, the controller 104 determines a set of PWM outputs ($V^*_{aPWM}$, $V^*_{bPWM}$, $V^*_{cPWM}$) 106 representing two states, which without loss of generality are described below as 1.0 and 0.0. Each one of the PWM outputs 106 corresponds to one of the three input phases of the electric motor 112, such that when the outputs are applied to the various input phases of the motor according to the corresponding PWM output, the motor will follow the commanded input.

The set of PWM voltage outputs 106 are passed from the controller 104 to the inverter 110 where they are used to open and close switches 118 such that a DC voltage 108 is converted to three PWM drive signals that drive corresponding input phases of the electric motor 112. Specifically, a PWM output of 1 results in the application of the positive DC supply voltage rail to the input phase and a PWM output of 0 results in the application of the negative DC supply voltage rail to the input phase.

The phase currents 114 (i.e., $i_a$, $i_b$, $i_c$ in FIG. 1) supplied to each input phase of the electric motor 112 are measured and passed back to the controller 104. The sensed feedback 116 is also passed back to the controller 104.

Referring to FIG. 2, one example of the controller 104 receives the command 102, the sensed phase currents 114, and the sensed feedback 116 as inputs. The inputs are passed to a multiphase control signal generator 220. The multiphase control signal generator 220 is configured to process the command input 102, the sensed currents 114, and the sensed feedback 116 and form three phase control voltages ($V_a$, $V_b$, $V_c$) 222. The phase control voltages 222 represent, in the example, a positive or negative value in the range of −1.0 to 1.0, corresponding to the coefficient that the DC supply voltage is multiplied by for application to the motor's input phase. Based on its inputs, the multiphase control signal generator 220 determines the three phase control voltages 222, for example, by using a field oriented or vector control algorithm.

The phase control voltages 222 are passed to a control signal modifier 227 along with the set of sensed phase currents 224. The control signal modifier 227 includes a zero sequence calculator 224 and addition modules 229 for modifying the phase control voltages 222 to produce the duty cycle signals 226. In some examples, the control signal modifier 227 is functionally transparent to the other modules in the system. Within the control signal modifier 227, the phase control voltages 222 are passed to the zero sequence calculator 224 along with the set of sensed phase currents 114. The zero sequence calculator 224 uses the inputs to determine the common mode of the phase control voltages 222 (i.e., in the range [−1.0 to 1.0]) and create a zero sequence signal 230, $V_0$, also in the range [−1.0 to 1.0]. Using the addition modules 229, the zero sequence signal 230 is combined with the phase control voltages 222 to create a set of duty-cycle signals 226, each in the range [0.0 to 1.0]. For example, the duty-cycle signals $V^*_x$ 226 can be calculated by solving for $V^*_x = 0.5 \cdot (V_x + V_0 + 1.0)$, with x representing one of the three phases a, b or c. Thus, the duty-cycle signals 226 are effectively the phase control voltages 222 shifted in level by the zero sequence signal 230 and coerced into the range 0 to 1. The resulting duty-cycle signals $V^*_x$ 226 inhibit unwanted switching in the PWM voltage commands 106.

The three duty cycle voltages 226 are then passed to a pulse width modulator 228 that determines the three PWM voltage outputs 106. In some examples, the resulting pulse width modulated voltage outputs 106 are square waves that alternate between high and low (i.e., 1 and 0) with switching frequencies determined by each of the phase control voltages 222 or by the rated characteristics of the devices utilized for switching. The pulse width modulator 228 can compare the duty-cycle voltages 226 to a carrier signal (e.g., a sawtooth wave) to produce the PWM voltage outputs 106. If the level of the duty-cycle is greater than the level of the carrier signal, the PWM voltage output value is 'one', otherwise, the PWM voltage output is 'zero'. The process of pulse width modulation is well known and is not further discussed herein.

2 Zero Sequence Calculator

The zero sequence calculator 224 uses the measured phase currents 114 ($i_a$, $i_b$, and $i_c$) and the phase control voltages 222 ($V_a$, $V_b$, $V_c$) to determine the zero sequence signal $V_0$ 230. The zero sequence signal 230 is determined such that when it is combined with the phase control voltages 222, one of the phases (generally referred to below as the "clamped phase," noting that the word "clamping" should be understood only within the context of this description and not to connote properties where it is used in other contexts) is purposefully set equal to an extreme voltage value ($V^*_x = -1.0$ or 1.0), thereby discontinuing switching for that phase. By eliminating switching for one of the phases at all times, the amount of switching can be reduced, thereby reducing losses due to excessive switching. This process is commonly referred to discontinuous pulse width modulation (DPWM).

In the following embodiments, two conditions are evaluated when determining the clamped phase. First, the phases eligible for clamping are determined, and then the eligible phase with the greatest current magnitude is clamped. Clamping the eligible phase with the greatest current magnitude ensures a maximum reduction in switching losses because switching losses are proportional to the current flowing in a switch during a transition.

The process of determining the phases that are eligible for clamping differs based on factors such as the signal quality of the phase control voltages 222 and the phase alignment between the measured phase currents 114 and the phase control voltages 222.

Figure 3:
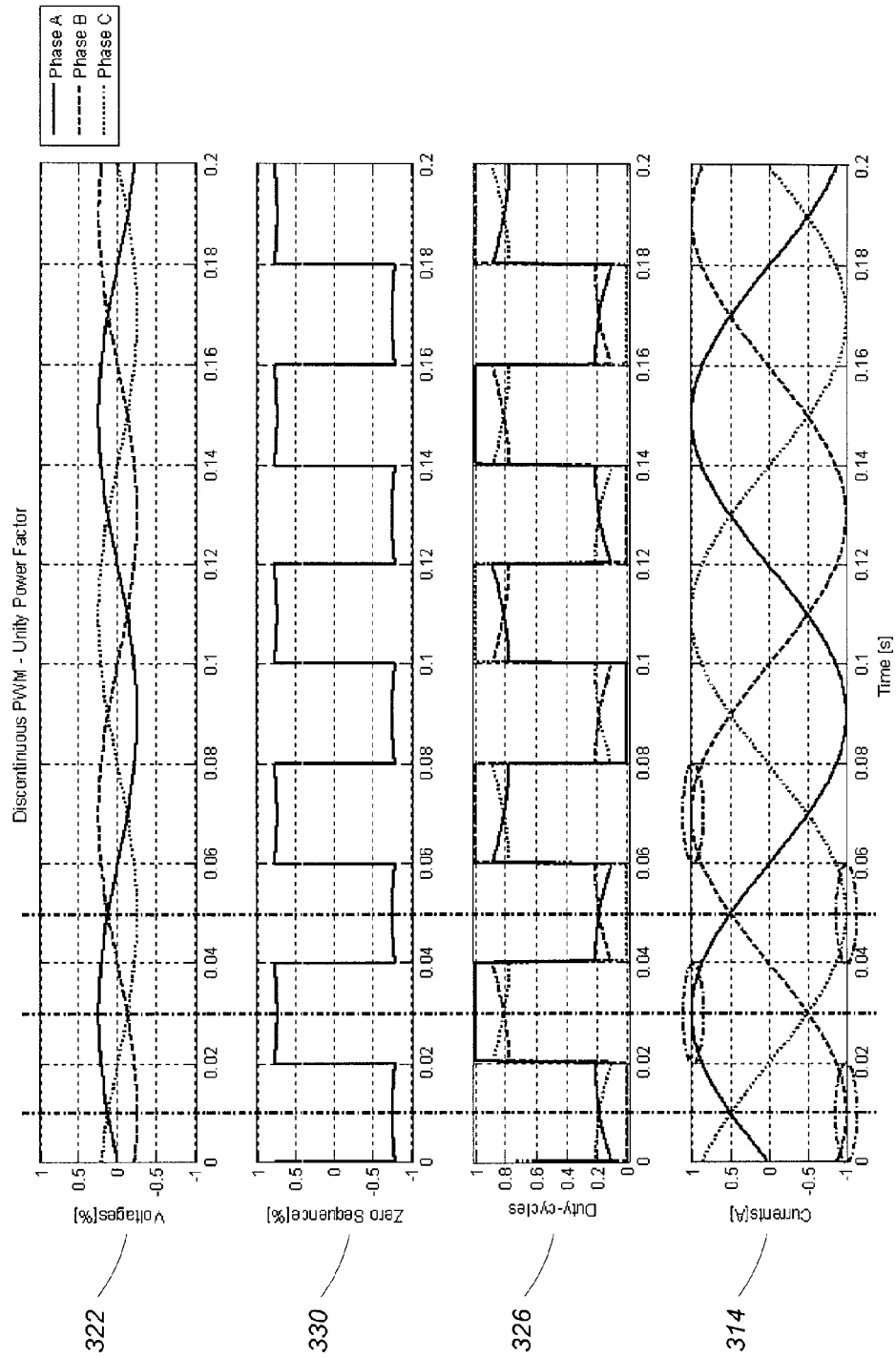
FIG. 3 is an illustration of Discontinuous PWM applied to a simple set of inputs.

Referring to FIG. 3, in one DPWM case, the three phase control voltages 322 are in phase with the corresponding sensed phase currents 314. In this simple case, it is not necessary to employ a separate test to determine which phases are eligible for clamping. The zero sequence signal 330 can be determined by simply detecting the phase corresponding to the sensed phase current with the greatest magnitude (circled in the phase currents graph 314) and clamping the corresponding phase. Because the phase control voltages 322 and the phase currents 314 are in phase and virtually noise free, there is little or no ambiguity regarding which phase control voltage should be clamped. Once the determination of which phase to clamp is complete, the zero sequence signal 330 is determined. In some examples, the zero sequence signal 330 is determined by subtracting the phase control voltage of the clamped phase from the closest of the extreme phase command voltage values (−1.0 or 1.0).

The zero sequence signal 330 represents a common mode voltage that is combined with the three phase control voltages 322, preserving the relationship (e.g., the differences and ordering) among them.

3 DPWM with a Voltage Test

Figure 4:
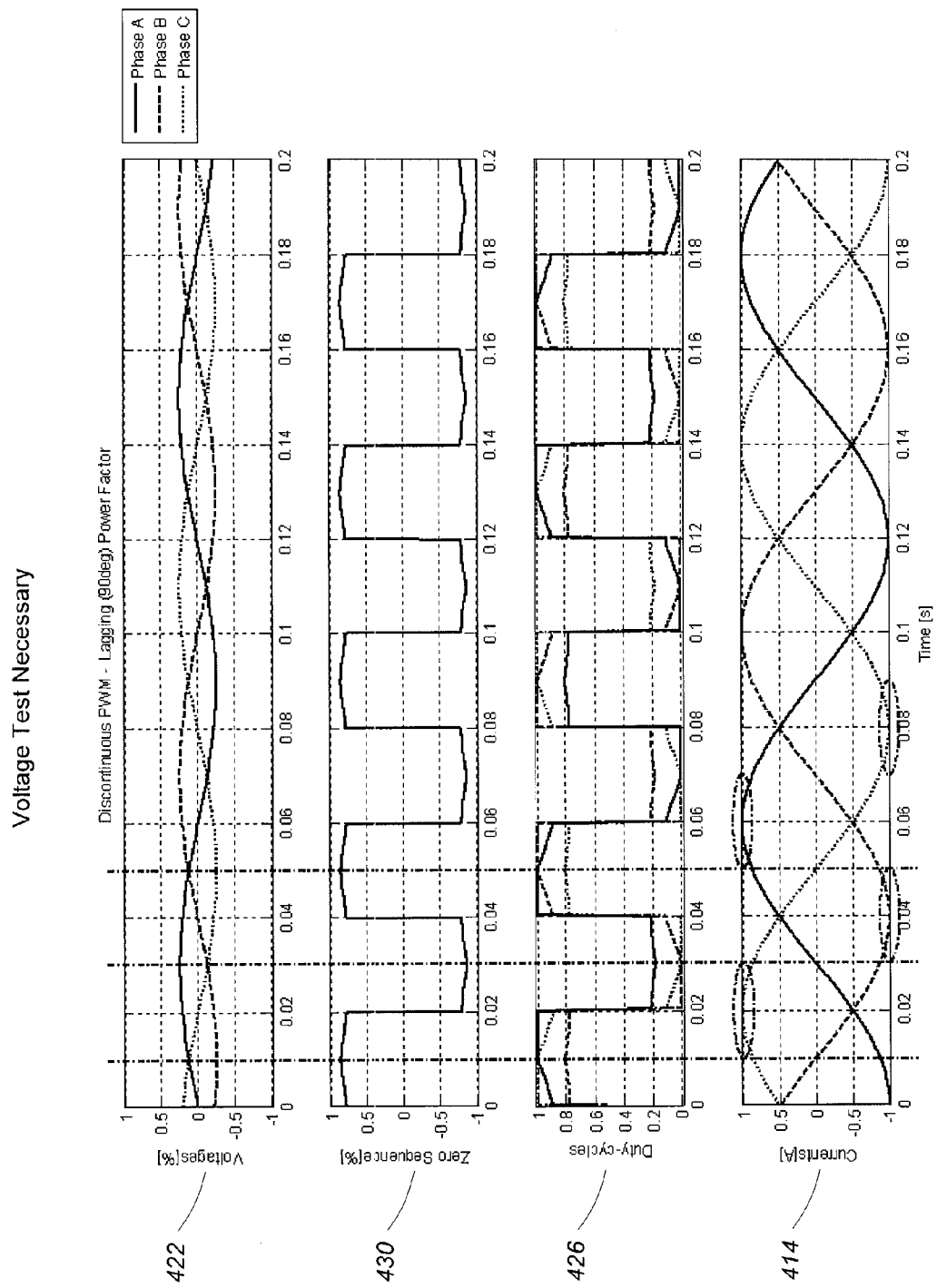
FIG. 4 is an illustration of Discontinuous PWM applied to a case where a voltage test is necessary.

Referring to FIG. 4, a more complex example includes three phase control voltages 422 that lead their corresponding phase currents 414 by approximately 90 degrees. The previously presented method of selecting which phase to clamp by simply selecting the phase with the highest current magnitude may not be appropriate in this situation. In particular, the phase control voltage corresponding to the phase with the greatest current magnitude is intermediate during the period that the phase current has the greatest magnitude (i.e., the phase current with the greatest magnitude, has a corresponding phase control voltage with a value that lies between the values of the other two phase control voltages). Thus, if the phase with the intermediate phase control voltage is clamped, the phase control voltage between the intermediate phase control voltage and the clamping maximum value is necessarily clamped as well and the relationship between the phases cannot be preserved. This is due to the fact that when creating the duty-cycles 426, the level relationship is preserved among the phase control voltages 422.

One solution to this problem is to apply a voltage test that identifies phases with intermediate phase control voltages. The identified phases are removed from consideration when selecting which phase to clamp.

For example, referring to the range of time from 0 sec to 0.01 sec, the phase with the greatest phase current magnitude (i.e., Phase A) has a phase control voltage that lies between the phase control voltages for Phase B and Phase C. Thus, Phase A is not eligible for clamping because its phase control voltage is intermediate. The remaining phases that are eligible for clamping are Phase B and Phase C. The phase currents associated with the remaining eligible phases are compared and the eligible phase associated with the greatest phase current magnitude within the time range (i.e., Phase C) is selected for clamping. In the same range of time, the zero sequence signal 430 is determined such that when all three phase control voltages 422 are added to it, Phase C is set to the clamped maximum value.

In another example, referring to the range of time from 0.01 sec to 0.02 sec, the phase with the greatest phase current magnitude (i.e., Phase C) has a phase control voltage that is intermediate and therefore the phase is not eligible for clamping. Thus, Phase A and Phase B are the remaining eligible phases. The phase current magnitudes of Phase A and Phase B are compared and the phase with the greatest phase current magnitude (i.e., Phase A) is selected for clamping. The zero sequence signal 430 in the range of time is determined such that when all three phase control voltages 422 are added to it, Phase A is set to the clamped maximum value.

Figure 5:
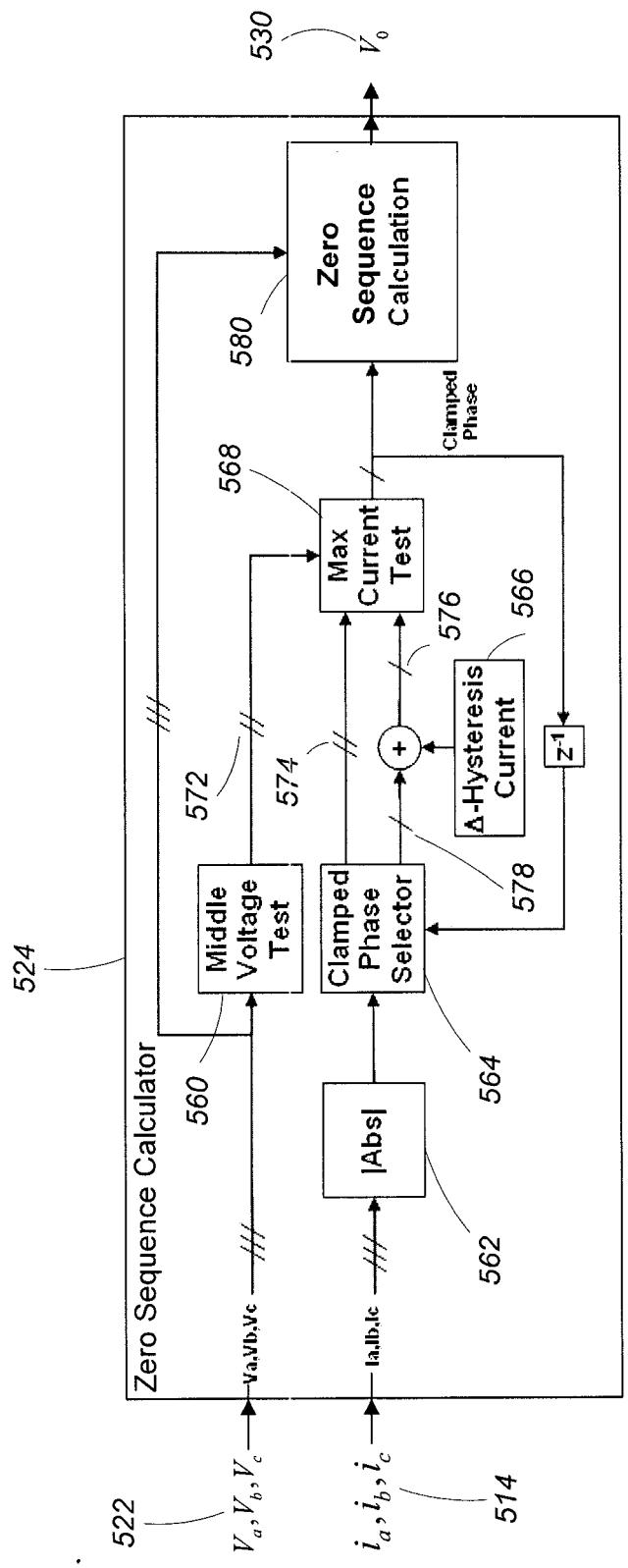
FIG. 5 is a block diagram of a zero sequence calculator including a voltage test.

Referring to FIG. 5, one embodiment of a zero sequence calculator 524 (an alternate version of the zero sequence calculator 228 in FIG. 2) is configured to select the eligible phases for clamping by applying the previously described voltage test to rule out the phase with the intermediate phase control voltage. In particular, the zero sequence calculator 524 receives phase control voltages 522 and phase currents 514 as inputs and produces a zero sequence signal 530 as an output. A middle voltage test 560 receives the phase control voltages 522 and determines the phases eligible for clamping. For example, the middle voltage test 560 identifies the phase control voltage that is intermediate by determining the phase control voltage with the middle value. The phase associated with the determined intermediate phase control voltage is removed from consideration as a potential phase to clamp when determining which phase to clamp. The remaining phases are termed clampable phases 572, and the information identifying which phases are eligible to be clamped is passed thru to the max current test 568, which is described in more detail below In a separate signal path, an absolute value module 562 calculates the absolute value of the phase currents 514. The result of the absolute value module 562 is passed to the clamped phase selector 564 where the phase current corresponding to the presently clamped phase is separated from the other phase currents. The clamped phase selector 564 receives as inputs the absolute value of the phase currents along with an input identifying which phase is currently being clamped. The clamped phase selector separates the absolute value of the current of the currently selected phase from the absolute values of the current in the other phases and provides them on separate outputs.

A small positive current value, the delta-hysteresis current 566, is then added to the separated phase current 578 of the currently clamped phase. This addition forces the absolute value of the now modified currently clamped phase current 576, that is input to the max current test 568, to be greater than the actual absolute value of phase current of the presently clamped phase 578 by at least an amount equal to the delta-hysteresis current 566.

The clampable phases 572, the absolute value of the phase currents not modified by the delta-hysteresis current 574, and the absolute value of the phase currents modified by the delta hysteresis current 576 are then passed to the max current test 568. The max current test 568 determines the phase to clamp by selecting, from the clampable phases 572, the phase with the greatest phase current magnitude. By adding in a small hysteresis value to the current magnitude of the currently clamped phase, rapid unnecessary switching of the phase to be clamped can be avoided in certain cases, such as when the currents in clampable phases are close to each other in magnitude and are noisy such that there are rapid variations moment to moment of the phase with maximum current.

The identification of the clamped phase is then passed to a zero sequence calculation module 580 where the zero sequence signal 530 is determined. The zero sequence calculator 580 also receives as input the phase control voltages 522, and calculates the zero sequence signal by subtracting the phase voltage of currently selected phase for clamping from the closest supply rail voltage.

3.1.1 Example of Unnecessary Switching

In a well behaved system such as in FIG. 4, the previously presented voltage test is sufficient to determine which phase to clamp. However, referring to FIG. 6, problems can arise when noise or other rapid variation is present in the phase control voltages 522. For example, voltage oscillations 525 caused by the effect of switching noise on the sampled currents can cause the result of the voltage test to rapidly change, thereby rapidly changing the phase that is clamped. These unnecessary transitions can result in switching losses at the inverter. In some examples, voltage oscillations 525 can be caused by perturbations on the sensed current signal that contribute to abrupt changes in the common mode voltage. Such abrupt changes can cause the closed-loop control system to react in an oscillatory manner.

3.1.2 Level 1 Solution

Figure 6:
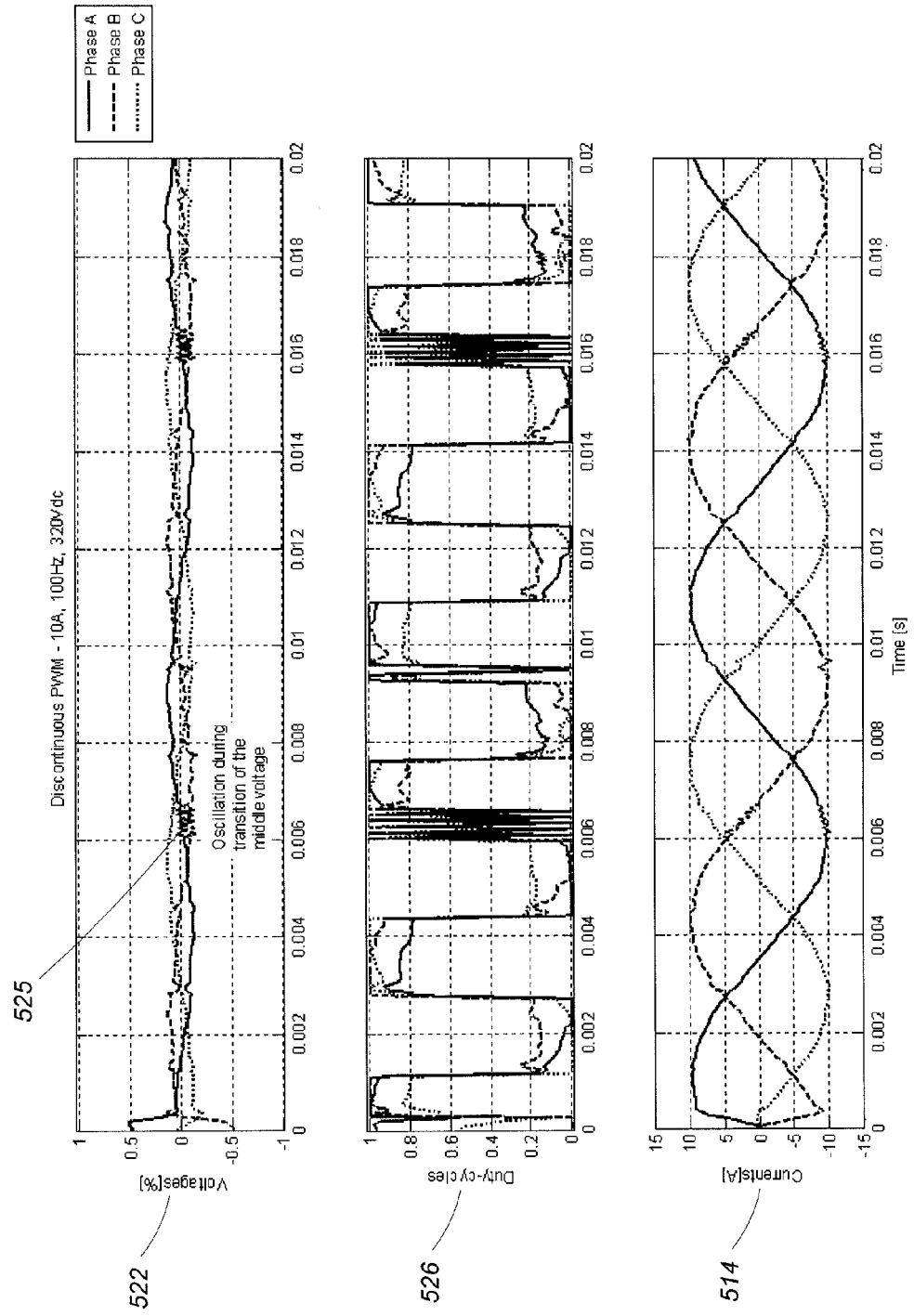
FIG. 6 is an example of unnecessary switching in a Discontinuous PWM system using a level 1 solution (i.e., voltage test).
Figure 7:
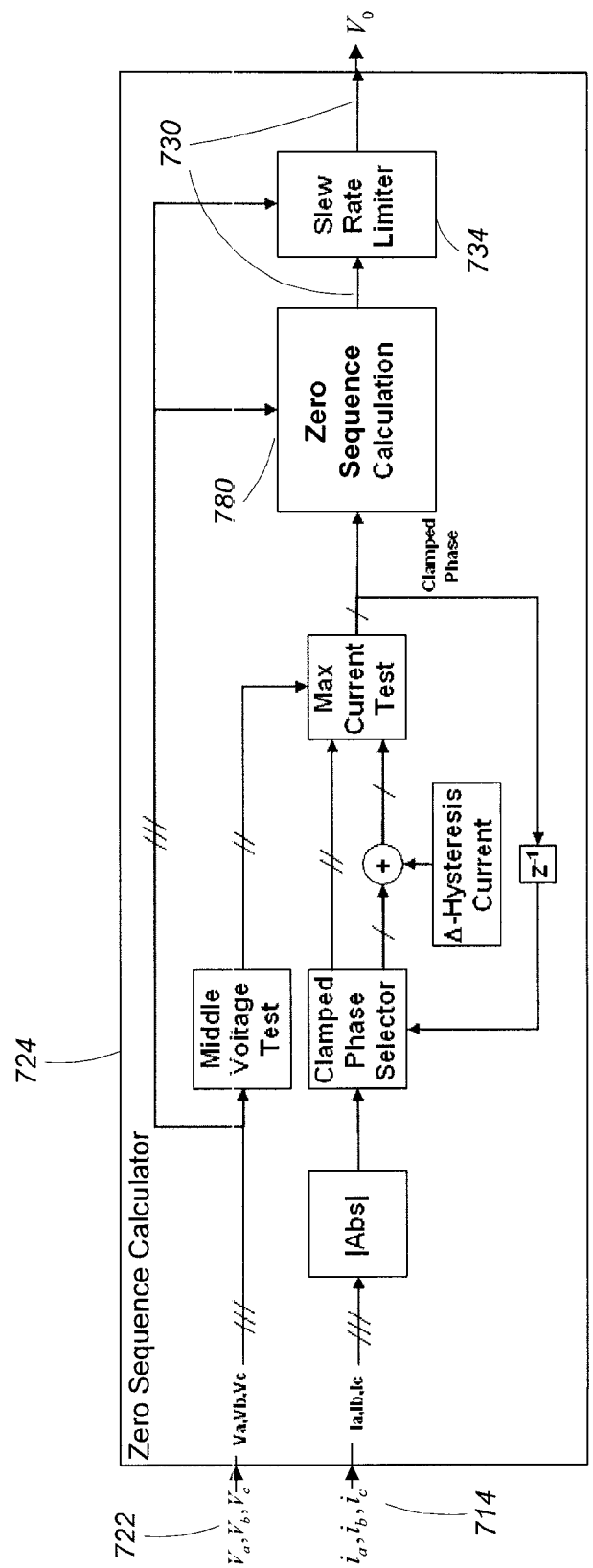
FIG. 7 is a block diagram of a zero sequence calculator including a slew rate limiter.

Referring to FIG. 7, a zero sequence calculator 724 (another example of the zero sequence calculator 224 in FIG. 2) is configured to inhibit the rapid switching exhibited in FIG. 6. The zero sequence calculator 724 uses the voltage test described above (i.e., with respect to FIG. 5) to determine the clamped phase. The clamped phase is then passed to a zero-sequence calculator 780 that generates a zero sequence signal 730. The zero sequence signal 730 is then passed to a slew rate limiter 734 that limits the allowable rate of change in the zero sequence signal 730. The slew rate limiter 734 reduces switching losses by inhibiting rapid transitions in the zero sequence signal 730.

Figure 8:
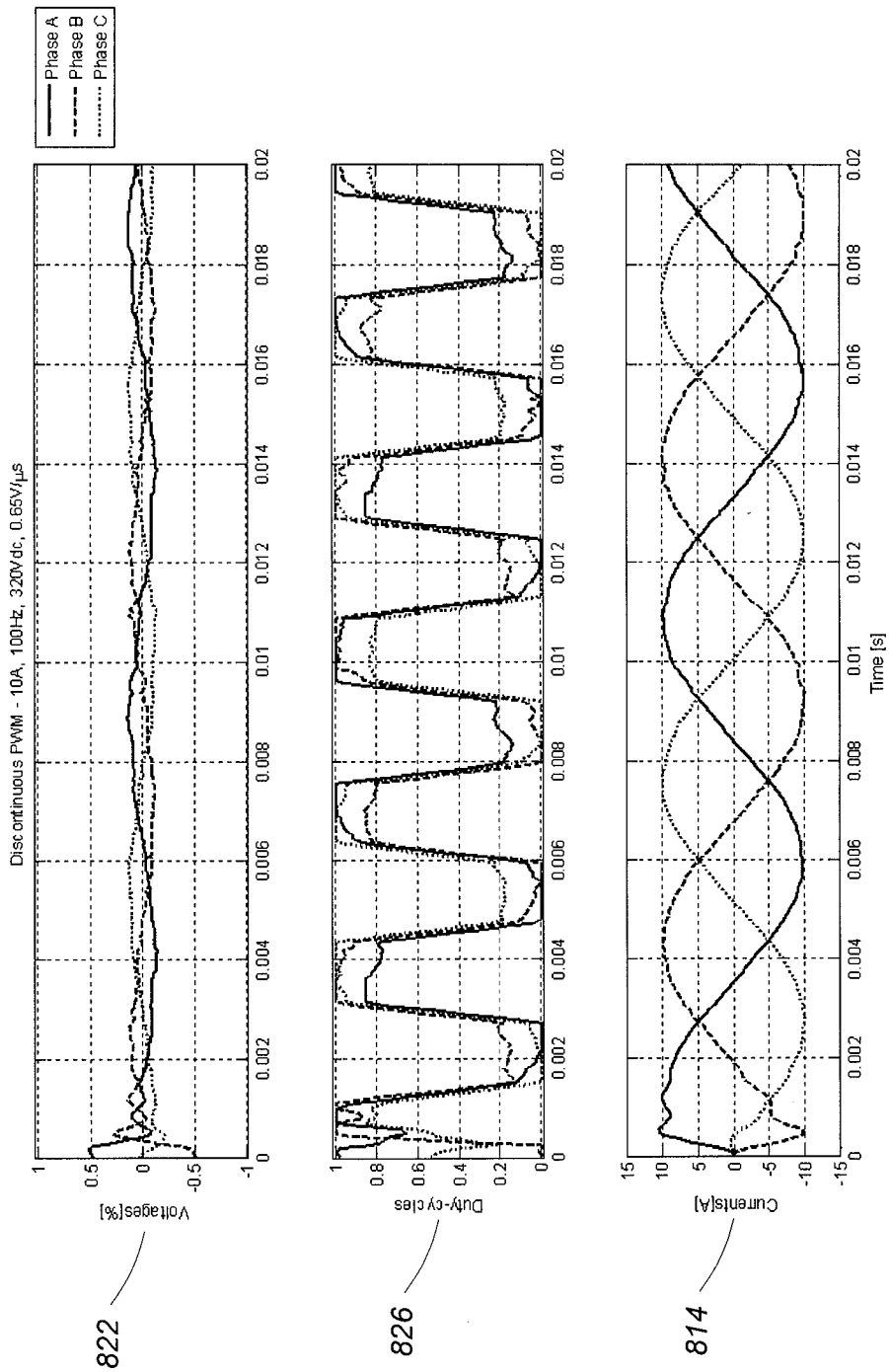
FIG. 8 is an example of the output of a slew rate limited Discontinuous PWM system.

Referring to FIG. 8, the resulting rate limited duty-cycle signals 826 include little or no unnecessary switching. However, the slope of the transitions in the duty-cycle signals 826 is reduced (i.e., the rise and fall times of the transitions are elongated and the phases remain clamped for a shorter duration). Reducing the amount of time a phase is clamped reduces the benefit of lower switching losses obtained.

Figure 9:
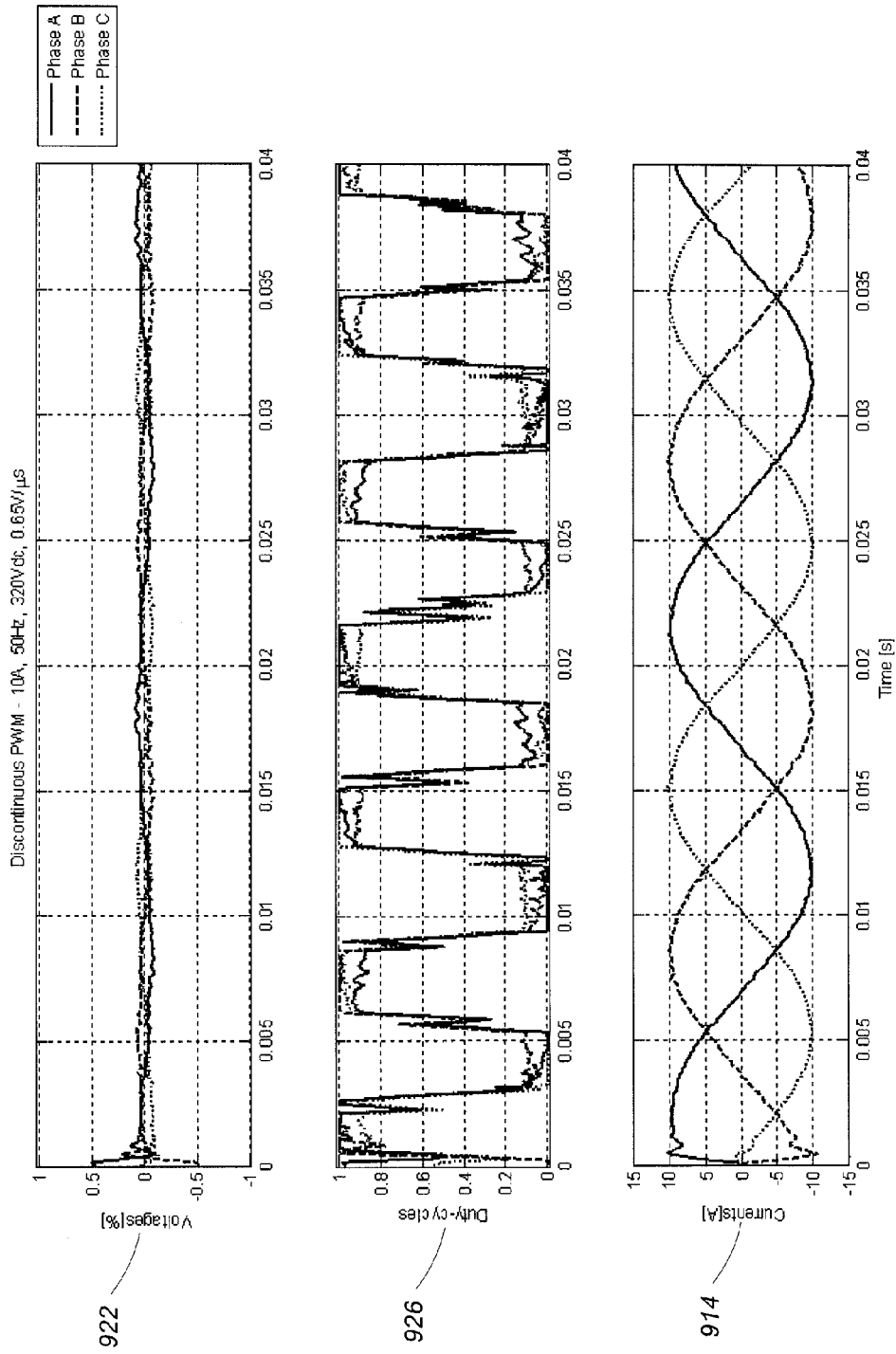
FIG. 9 is an example of the output of a slew rate limited Discontinuous PWM system that doesn't have enough slew rate limiting applied.

Referring to FIG. 9, in some examples, the signal to noise ratio in the phase control voltages 922 may be small, for example, when the phase control voltage magnitudes are small. If the zero sequence slew rate is kept the same as for the case when the signal to noise ratio in the phase control voltages is high, the oscillations (and the accompanying unwanted switching) may re-appear as illustrated in the duty-cycles 926 in FIG. 9.

Figure 10:
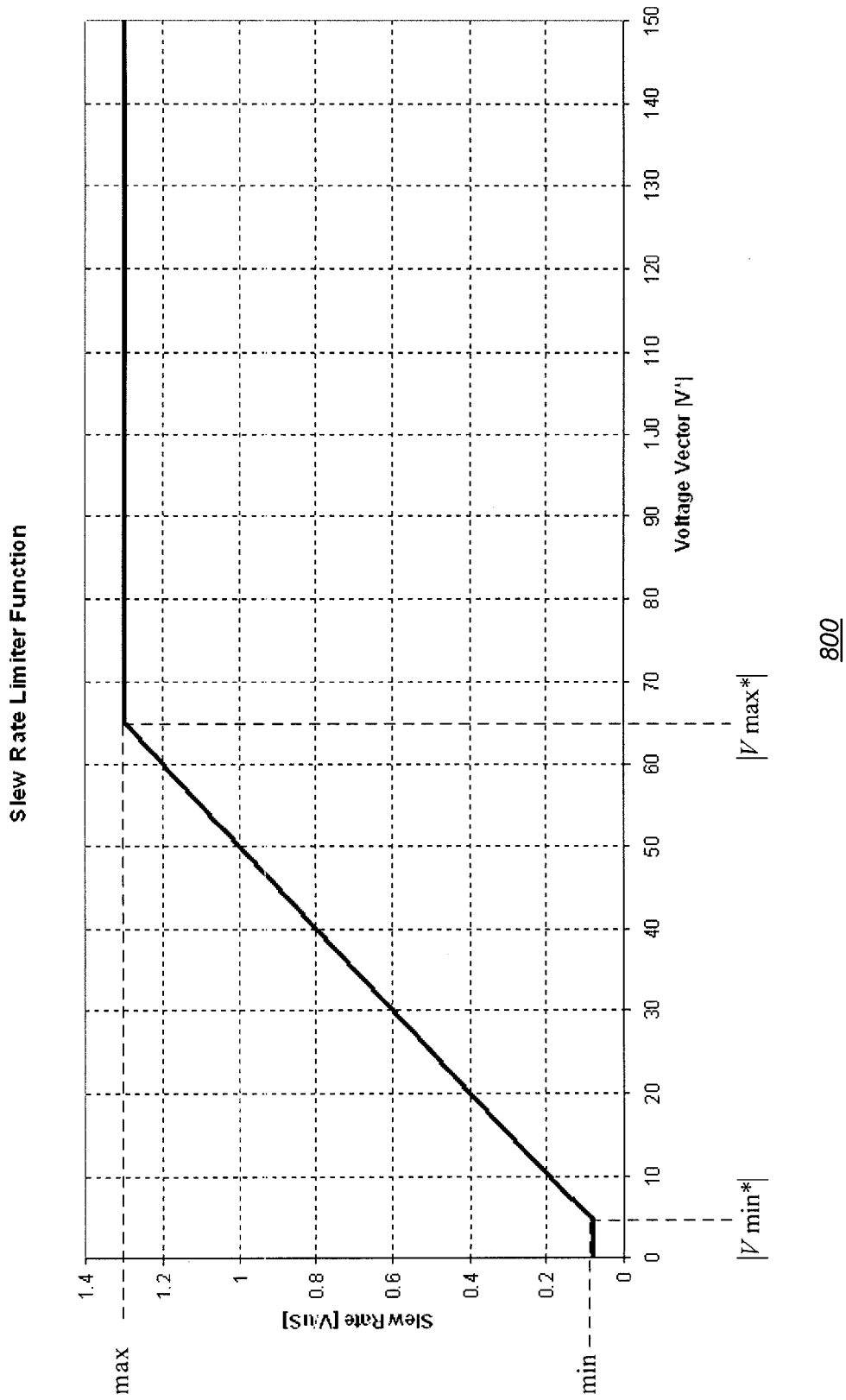
FIG. 10 is a graph illustrating how a slew rate limiter adapts its slope according to the magnitude of the control voltage vector.

Referring to FIG. 10, in some examples, the slew rate can be adjusted according to the magnitude of the vector V* obtained from the phase control voltages 922. The slew rate limiter 800 has its slew rate adapted according to the voltage vector magnitude |V*|. For example, the slope of the slew rate limiter 800 is adapted according to the following equation:

$$\left|\frac{dv_0}{dt}\right| = \begin{cases} \text{slope\_max} & \text{if } |V^*| \geq V_{max} \\ s(|V^*|) & \text{if } V_{min} < |V^*| < V_{max} \\ \text{slope\_min} & \text{if } |V^*| \leq V_{min} \end{cases}$$

Where |V*| is the magnitude of the vector associated with the phase control voltages and $s(|V^*|)$ is defined by the graph in FIG. 10. The complex number representation of V* and its corresponding magnitude |V*| can be calculated from the phase control voltages $V_a$, $V_b$ and $V_c$ according to the following equations:

$$V^* \equiv \frac{2}{3}\left[V_a + V_b\left(-\frac{1}{2} + j\frac{\sqrt{3}}{2}\right) + V_c\left(-\frac{1}{2} - j\frac{\sqrt{3}}{2}\right)\right]$$

$$|V^*| = \sqrt{V_a^2 + \frac{(V_b - V_c)^2}{3}}$$

In the exemplary slew rate limiter of FIG. 10, when the commanded voltage vector |V*| has a value less than or equal to |V min*| (e.g., |V*| less than or equal to 4V), the slew rate is maintained at a constant value (e.g., 0.1 V/μs). When |V*| is greater than |V min*| and less than |V max*| (e.g., |V*| in the range 4V to 65V), the slew rate increases linearly according to the function s(|V*|). When |V*| is greater than |V max*|, the slew rate is maintained at a constant max slew rate value (e.g., max=1.3 V/μs).

Figure 11:
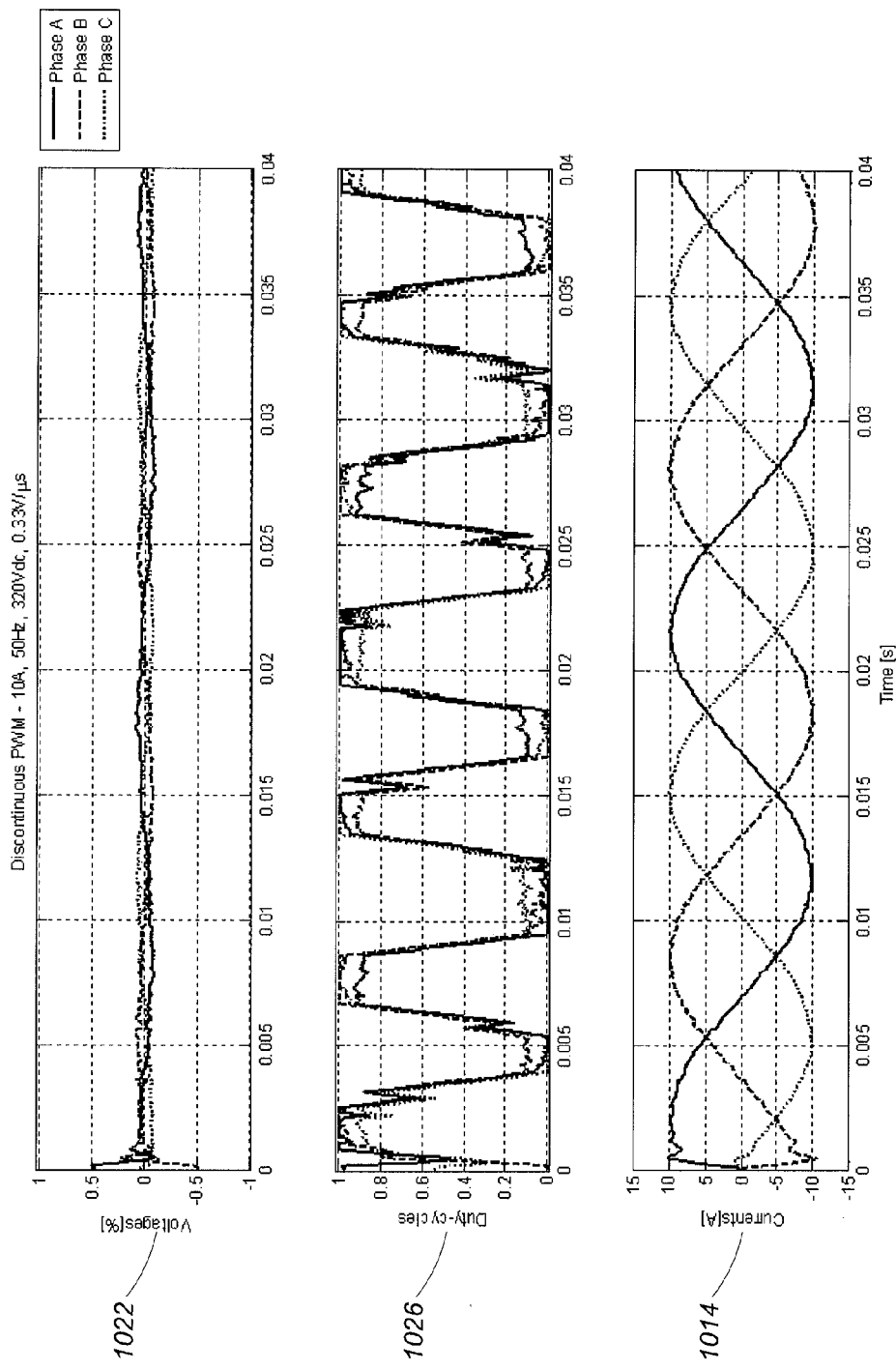
FIG. 11 is an example of the output of a slew rate limited Discontinuous PWM system showing reduced clamping time.

Referring to FIG. 11, the unwanted transitions are reduced by using the adaptive slew rate presented in FIG. 10. A side effect of the adaptive slew rate presented in FIG. 10 is that clamping time and the rate of change of the duty cycle can be significantly reduced, which can reduce the benefit of reduced switching losses obtained by phase clamping.

Typically for low level signals, SNR may decrease to a point where it is no longer possible to reach a suitable compromise between reduced oscillations and maximum clamping time. Thus a level 2 solution is preferable.

3.1.3 Level 2 Solution

Figure 12:
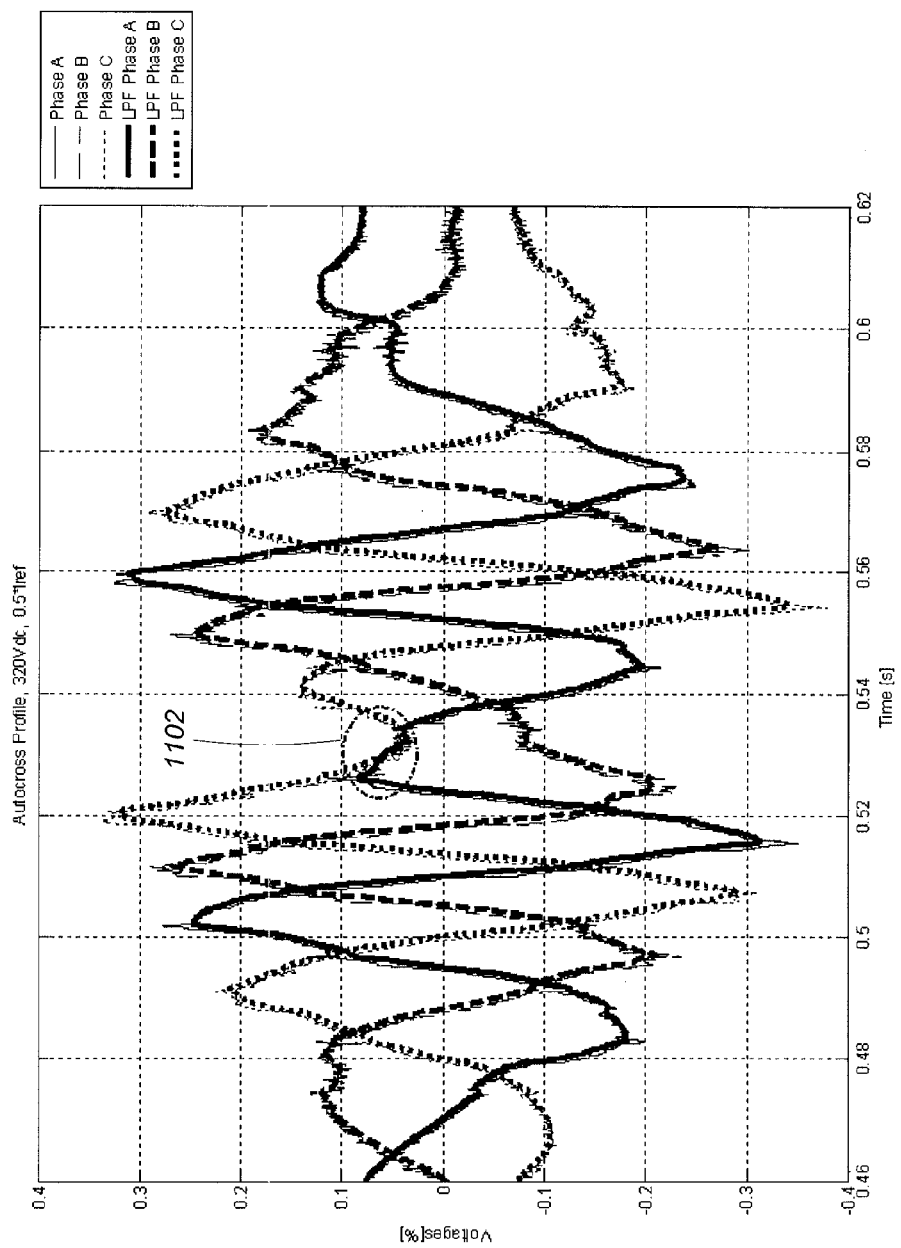
FIG. 12 illustrates typical control voltages in a highly dynamic PMLSM application.

The previously presented examples included current and voltage signals that were dominated by a single fundamental frequency plus noise. Referring to FIG. 12, some more dynamic motor drive examples (e.g., active suspension control using a Permanent Magnet Linear Synchronous Motor (PMLSM)), can contain signals including a plurality of frequencies including noise and even DC components. At times, two of the phases can have control voltages at substantially the same level as shown in the circled area 1102 of FIG. 12.

The frequent crossing of phase control voltages in the circled area 1102 may result in the voltage test rapidly transitioning the phase that is clamped. Such multiple transitions can result in unwanted switching in the inverter.

Figure 13:
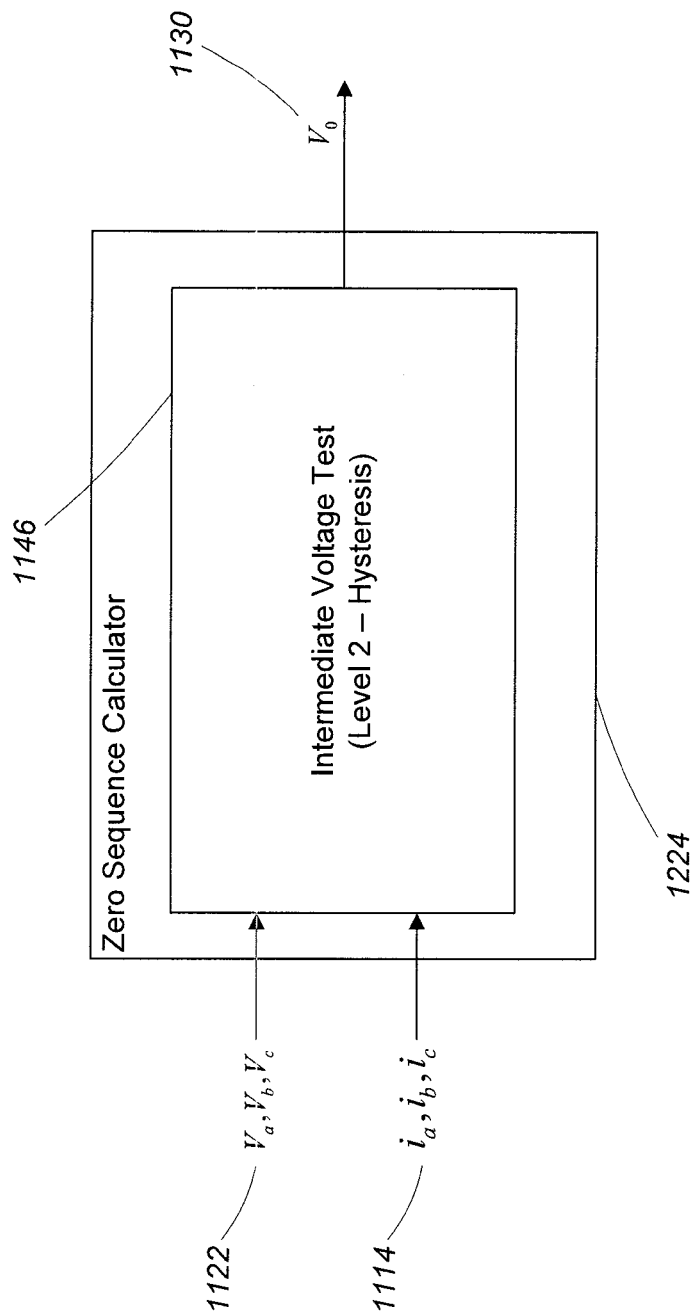
FIG. 13 is a block diagram of a zero sequence calculator including a level 2 hysteresis algorithm.

Referring to FIG. 13, the zero sequence calculator 1224 can include a level 2 intermediate voltage test 1146 that utilizes a hysteresis algorithm. In order to avoid unwanted transitions, the intermediate voltage test includes information about the proximity between the intermediate phase control voltage and its adjacent phase control voltages.

3.1.3.1 Hysteresis Overview

Figure 14:
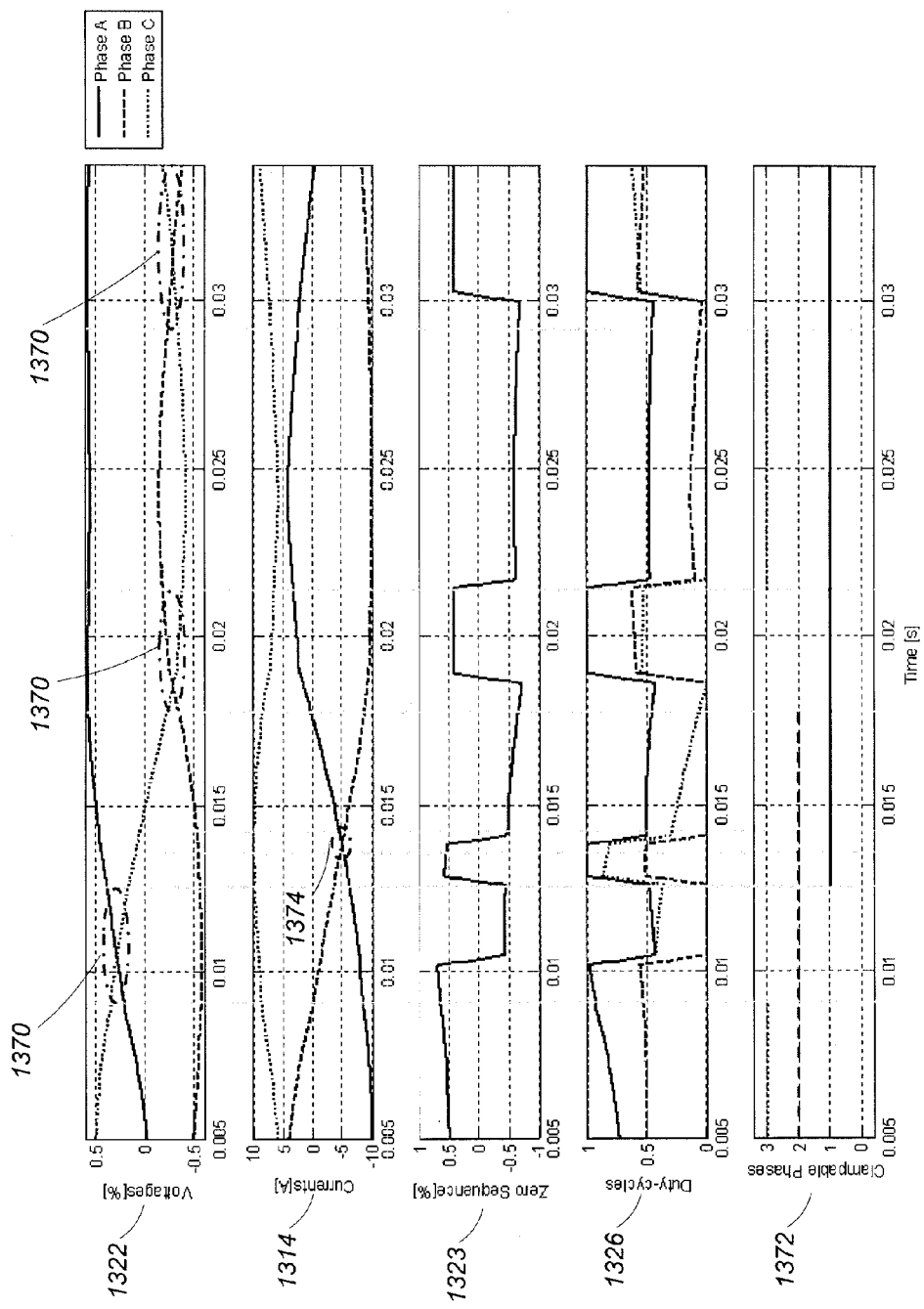
FIG. 14 illustrates the application of the level 2 hysteresis algorithm to an exemplary set of inputs.

Referring to FIG. 14, the hysteresis algorithm is applied to an exemplary set of phase control voltages 1322 and phase currents 1314 for the purpose of determining which phase to clamp.

The first step in the algorithm determines which phases are eligible for clamping. Eligible phases are determined by first determining the phase control voltages 1322 that are in close proximity to one another. For example, the circled portions 1370 in the phase control voltage graph 1322 are determined to be in close proximity to one another. The portion of time where the phase control voltages 1322 are in close proximity 1370 is indicated by a vertical shaded gray bar in FIG. 14. In the shaded gray portions, only one phase is eligible for clamping. For example, in the first shaded gray portion, the phase control voltages $V_a$ and $V_c$ are in close proximity to each other and thus their corresponding phases are ineligible for clamping. The only phase eligible for clamping is the phase associated with $V_b$ (as illustrated by the clampable phases graph 1372).

In some portions of time, none of the phase control voltages are in close proximity to each other (shown as unshaded areas in FIG. 14). In these portions of time, the algorithm applies the previously presented intermediate voltage test to determine the phases that are eligible for clamping. For example, in the first unshaded portion of time, $V_a$ is an intermediate voltage (i.e., its values are less than those of $V_c$ and greater than those of $V_b$). Thus, the phases eligible for clamping are those associated with $V_b$ and $V_c$ (as illustrated by the clampable phases graph 1372).

Next, the phase to clamp is determined. In the case that there is only one phase eligible for clamping, the algorithm simply clamps that phase. However, in the case that there is more than one phase eligible for clamping, the phase with the greatest corresponding phase current magnitude is clamped.

In some examples, the phase control voltage with the greatest corresponding phase current magnitude may change within a given time period (e.g., the circled area 1374 in the current graph 1314). In such a case, the determined clamped phase is changed accordingly.

Following the determination of the clamped phase, the zero sequence signal 1323 and the duty-cycle signal 1326 are determined in the same manner as described above in section 2.3.

3.1.3.2 Detailed Hysteresis Algorithm

Figure 15:
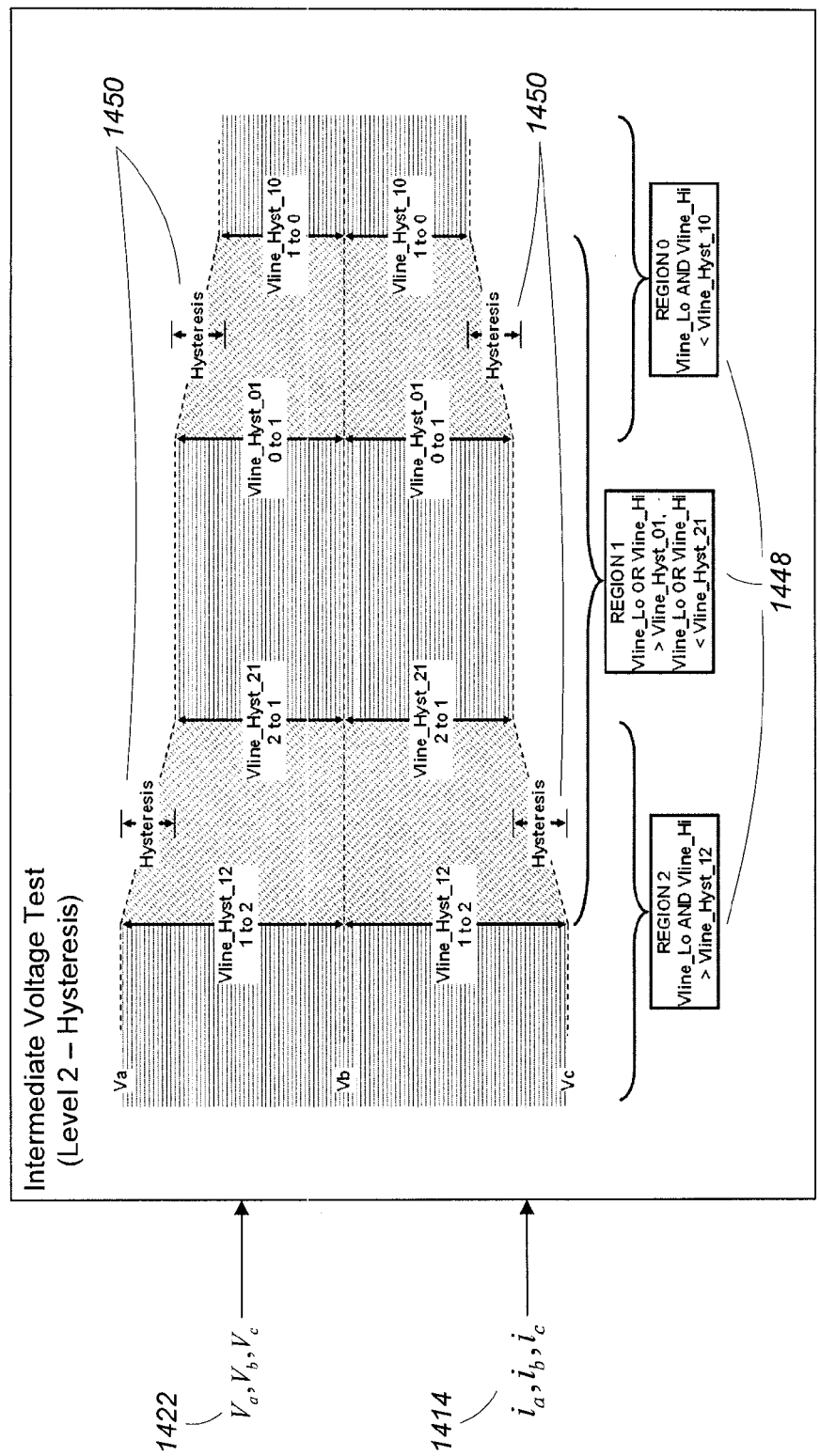
FIG. 15 illustrates an exemplary representation of the regions in a level 2 hysteresis algorithm.

Referring to FIG. 15, a number of voltage operating regions 1448, REGION 0 through REGION N, can be defined as well as their interfacing hysteresis bands 1450.

In some examples, each phase control voltage 1422 $V_a$, $V_b$ and $V_c$ can be associated with the variable set $V_{lo}$, $V_{mid}$, or $V_{hi}$ such that $V_{lo} \leq V_{mid} \leq V_{hi}$. Similarly, each phase current 1414 $I_a$, $I_b$ and $I_c$ can be associated with the variable set $I_{lo}$, $I_{mid}$, or $I_{hi}$ such that $I_{lo} \leq I_{mid} \leq I_{hu}$. The following definitions apply:

Phase_Lo=Phase corresponding to $V_{lo}$ or $I_{lo}$.

Phase_Hi=Phase corresponding to $V_{hi}$ or $I_{hi}$.

Vline_Lo=|LPF($V_{mid}$–$V_{lo}$)|=Lowpass filtered absolute voltage difference between middle and lower voltages.

Vline_Hi=|LPF($V_{hi}$–$V_{mid}$)|=Lowpass filtered absolute voltage difference between middle and higher voltages.

Vline_Hyst_01=Voltage threshold checked for transitioning from REGION 0 to REGION 1

Vline_Hyst_10=Voltage threshold checked for transitioning from REGION 1 to REGION 0

Vline_Hyst_12=Voltage threshold checked for transitioning from REGION 1 to REGION 2

Vline_Hyst_21=Voltage threshold checked for transitioning from REGION 2 to REGION 1

Continuing to refer to FIG. 15, region 0 encompasses phase control voltages 1422 that satisfy Vline_Lo AND Vline_Hi less than Vline_Hyst_10.

Region 1 encompasses phase control voltages 1422 that satisfy Vline_Lo OR Vline_Hi greater than Vline_Hyst_01, and Vline_Lo OR Vline_Hi less than Vline_Hyst_21.

Region 2 encompasses phase control voltages 1422 that satisfy Vline_Lo AND Vline_Hi greater than Vline_Hyst_12.

Figure 16:
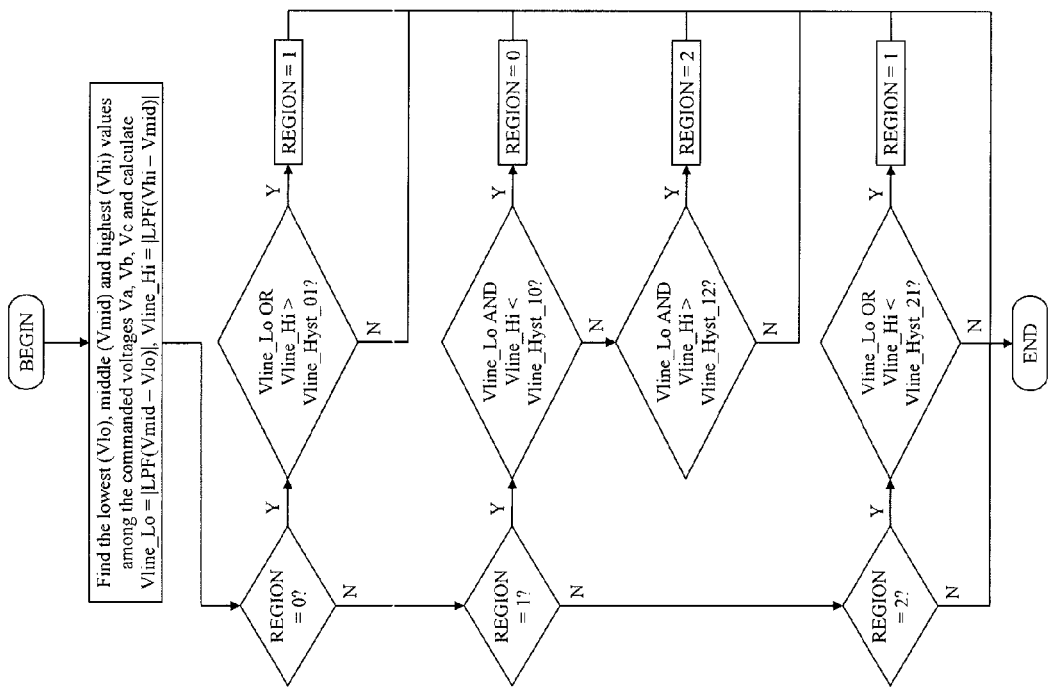
FIG. 16 is a flow chart showing how the level 2 hysteresis algorithm identifies regions.
Figure 17:
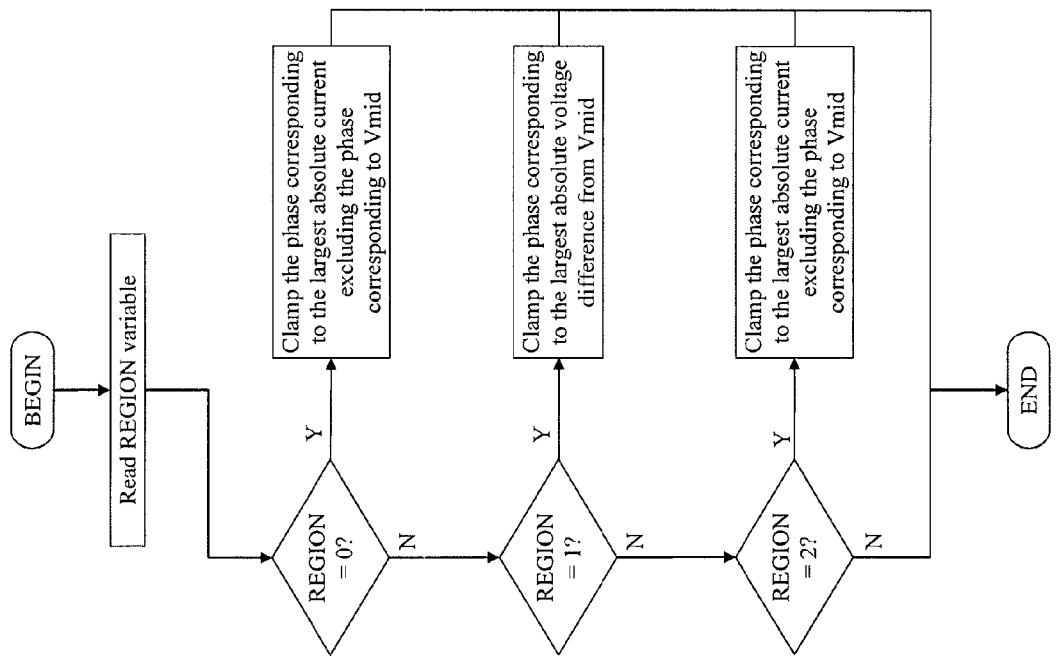
FIG. 17 is a flow chart showing how the level 2 hysteresis algorithm determines which phase voltage command to clamp.
Figure 18:
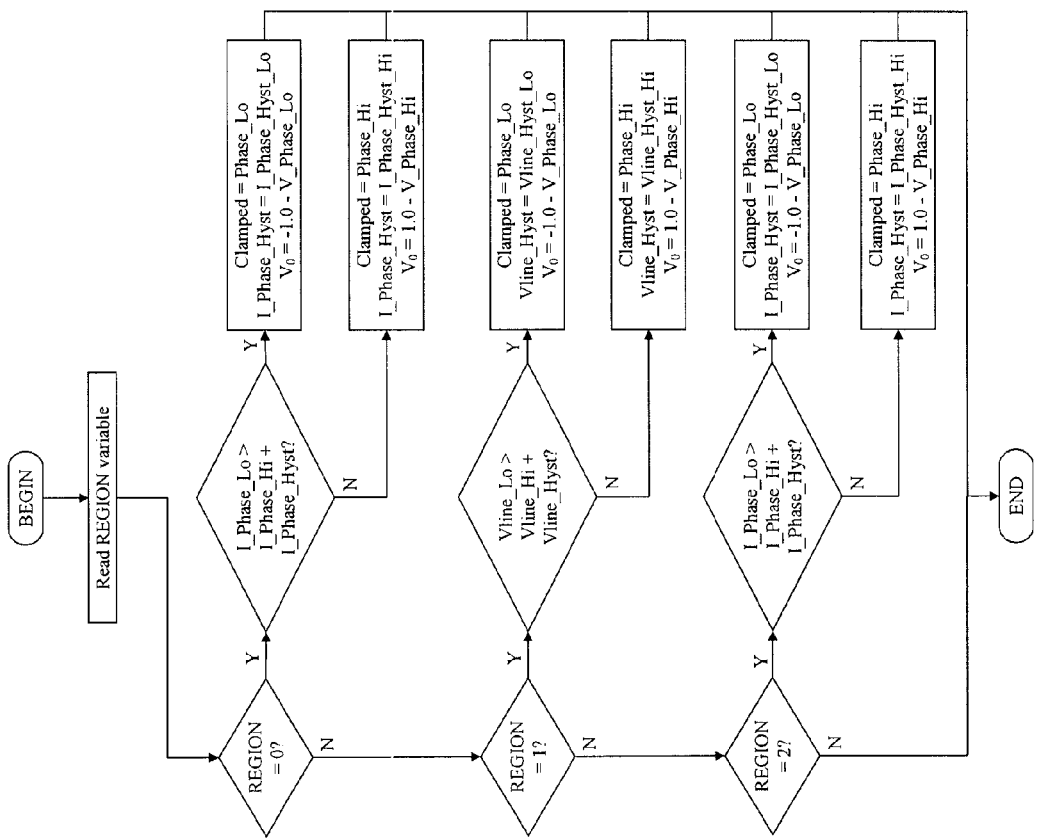
FIG. 18 is a more detailed flow chart showing how the level 2 hysteresis algorithm determines which phase voltage command to clamp.

FIGS. 16, 17, and 18 illustrate the hysteresis algorithm in flow chart form.

Referring to FIG. 16, a flow diagram of the hysteresis algorithm presents steps for determining the voltage operating region. The algorithm first finds the lowest, middle, and highest ($V_{lo}$, $V_{mid}$, $V_{hi}$) values among the phase control voltages. Vline_Lo and Vline_Hi are then calculated using the following formulas:

$$Vline\_Lo = |LPF(Vmid - Vlo)| \quad 5$$

$$Vline\_Hi = |LPF(Vhi - Vmid)|$$

Where LPF represents a lowpass filtering operation.

If the present region is 0 and Vline_Lo OR Vline_Hi is greater than Vline_Hyst_01, the region is changed to 1. Otherwise, the region remains 0.

If the present region is 1 and Vline_Lo AND Vline_Hi is less than Vline_Hyst_10, the region is changed to zero, otherwise, if Vline_Lo AND Vline_Hi is greater than Vline_Hyst_12, the region is changed to 2. If neither condition is satisfied, the region remains 1.

If the present region is 2 and Vline_Lo OR Vline_Hi is less than Vline_Hyst_21, the region is changed to 1. Otherwise the region remains 2.

Referring FIG. 17, a flow diagram presents criteria based on the voltage operating region that may be applied to select a phase to be clamped. The voltage operating region value determined in FIG. 16 is read and passed into a conditional statement that determines which phase control voltage is clamped.

If the region is 0 the phase corresponding to the largest absolute current, excluding the phase corresponding to $V_{mid}$ is clamped. If the region is 1 the phase corresponding to the largest absolute voltage difference from $V_{mid}$ is clamped. If the region is 2 the phase corresponding to the largest absolute current, excluding the voltage command corresponding to $V_{mid}$ is clamped. If none of the conditions is satisfied, the clamped phase is not changed.

Referring to FIG. 18, a flow diagram presents a more detailed view of the criteria that may be applied to select a phase to be clamped. First, the region value determined in FIG. 16 is read and passed into a conditional statement that determines which phase is clamped.

If the region is 0 and I_Phase_Lo is greater than I_Phase_Hi plus I_Phase_Hyst, the clamped phase is Phase_Lo and I_Phase_Hyst is I_Phase_Hyst_Lo. Otherwise, the clamped phase is Phase_Hi and I_Phase_Hyst is I_Phase_Hyst_Hi.

If the region is 1 and Vline_Lo is greater than Vline_Hi plus Vline_Hyst, the clamped phase is Phase_Lo and Vline_Hyst is Vline_Hyst_Lo. Otherwise, the clamped phase is Phase_Hi and Vline_Hyst is Vline_Hyst_Hi.

If the region is 2 and I_Phase_Lo is greater than I_Phase_Hi plus I_Phase_Hyst, the clamped phase is Phase_Lo and I_Phase_Hyst is I_Phase_Hyst_Lo. Otherwise, the clamped phase is Phase_Hi and I_Phase_Hyst is I_Phase_Hyst_Hi.

If the region is unknown, the clamped phase, Vline_Hyst, and I_Phase_Hyst remain unchanged.

3.1.3.3 Experimental Results

Figure 19:
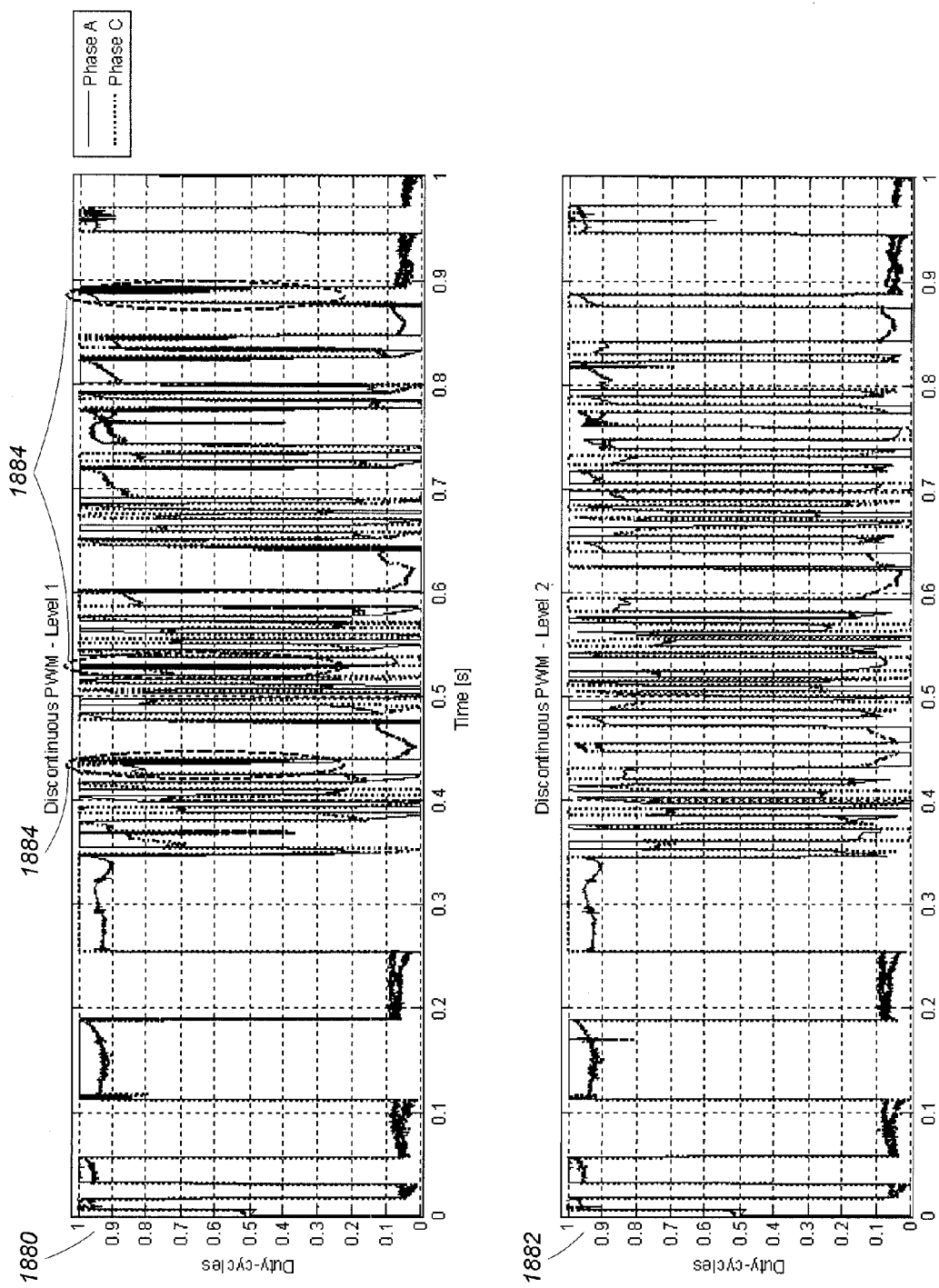
FIG. 19 shows exemplary experimental results comparing the level 1 solution to the level 2 solution.

Referring to FIG. 19, experimental results illustrate a reduction in unwanted switching between the level 1 solution 1880 (i.e., rate limiting) and the level 2 solution 1882 (i.e., hysteresis). In particular, the circled instances of unwanted switching 1884 in the level 1 solution duty-cycles 1880 are not present in the level 2 solution duty-cycles 1882.

It is to be understood that the foregoing description is intended to illustrate and not to limit the scope of the invention, which is defined by the scope of the appended claims. Other embodiments are within the scope of the following claims.

What is claimed is:

1. A method for pulse width modulation control of a multiple phase drive comprising:
   identifying a set of at least one phase from the plurality of phases for the drive as eligible for clamping to one of a plurality of extreme power supply voltages;
   selecting a phase from the set of eligible phases having a largest magnitude driving current of the set of eligible phases;
   determining a first offset signal as a difference between a control signal level for the selected phase and an extreme control signal level corresponding to one of the plurality of extreme power supply voltages;
   limiting a rate of change of the first offset signal to form a second offset signal; and
   determining a modified control signal for each of the phases for the drive including forming for each of a plurality of the phases a combination of the second offset signal and a control signal level for the phase to determine the modified control signal for the phase.

2. The method of claim 1, wherein identifying a set of at least one phase from the plurality of phases for the drive as eligible for clamping to one of a plurality of extreme power supply voltage includes applying a control-signal-level based test to a plurality of control signal levels corresponding to the plurality of phases for the drive to determine one or more phases to exclude from the set of at least one phase.

3. The method of claim 2, wherein the control-signal-level based test includes identifying one or more intermediate control signal levels of the plurality of control signal levels having signal levels between the maximum and the minimum control signal levels and excluding the phase corresponding to the one or more intermediate control signal levels from the set of at least one phase.

4. The method of claim 1, wherein selecting the phase from the set of eligible phases having the largest magnitude driving current of the set of eligible phases includes:
   comparing a set of driving currents associated with the set of eligible phases,
   determining the eligible phase with the largest magnitude driving current based on the comparison of the set of driving currents as the selected phase.

5. The method of claim 1, wherein the rate of change of the first offset signal is limited according to a parameter determined from the plurality of control signal levels.

6. The method of claim 5, wherein the parameter is formed as a magnitude of a control signal vector determined from the plurality of control signal values.

7. The method of claim 5, wherein the rate of change of the first offset signal is limited to a range between a first rate of change value and a second rate of change value.

8. The method of claim 5, wherein the rate of change of the first offset signal is a monotonic function of the parameter.

9. The method of claim 5, wherein,
   the rate of change of the first offset signal is limited according to a parameter determined from the control signal levels,
   the parameter is formed as a magnitude of a control signal vector determined from the plurality of control signal values, and
   the rate of change of the first offset signal is a monotonic function of the parameter.

10. The method of claim 1, wherein each pulse width modulated control signal of a plurality of pulse width modulated control signals is determined according a corresponding one of the modified control signals of the plurality of phases.

11. The method of claim 1 further comprising accepting sensor output representing driving currents of the plurality of phases and selecting the phase from the set of eligible phases includes selecting the phase having the largest magnitude driving current of the set of eligible phases according to the accepted sensor output.

12. A multi-phase controller comprising:
a control signal modifier including
an input for receiving a plurality of control signals;
an input for receiving a plurality of drive currents; and
an output for providing a plurality of modified control signals;
wherein the control signal modifier is configured to
identify a set of at least one phase from a plurality of phases for a multi-phase drive as eligible for clamping to one of a plurality of extreme power supply voltages;
select a phase from the set of eligible phases having a largest magnitude driving current of the set of eligible phases;
determine a first offset signal as a difference between a control signal level for the selected phase and an extreme control signal level corresponding to one of the plurality of extreme power supply voltages;
limit a rate of change of the first offset signal to form a second offset signal; and
determine a plurality of modified control signals, one for each of the phases for the drive including forming for each of a plurality of the phases a combination of the second offset signal and a control signal level for the phase to determine the modified control signal for the phase.

13. The multi-phase controller of claim 12, further comprising a pulse width modulator configured to accept the plurality of modified control signals and determine each pulse width modulated control signal of a plurality of pulse width modulated control signals according to a corresponding one of the plurality of modified control signals.

14. The multi-phase controller of claim 13, further comprising a control signal generator including
an input for receiving a feedback signal;
an input for receiving a command signal;
an input for receiving a plurality of drive currents; and
an output for providing a plurality of control signals;
wherein the control signal generator is configured to determine the plurality of control signals in response to at least one of the feedback signal, the command signal, and the plurality of drive currents.

15. The multi-phase controller of claim 12, wherein the control signal modifier is further configured to identify the set of at least one phase from the plurality of phases for the drive as eligible for clamping to one of a plurality of extreme power supply voltage including applying a control-signal-level based test to a plurality of control signal levels corresponding to the plurality of phases for the drive to determine one or more phases to exclude from the set of at least one phase.

16. The multi-phase controller of claim 15, wherein the control-signal-level based test includes identifying one or more intermediate control signal levels of the plurality of control signal levels having signal levels between the maximum and the minimum control signal levels and excluding the phase corresponding to the one or more intermediate control signal levels from the set of at least one phase.

17. The multi-phase controller of claim 12, wherein the control signal modifier is further configured to select the phase from the set of eligible phases having the largest magnitude driving current of the set of eligible phases including
comparing a set of driving currents associated with the set of eligible phases,
determining the eligible phase with the largest magnitude driving current based on the comparison of the set of driving currents as the selected phase.

18. The multi-phase controller of claim 12, wherein the control signal modifier includes a slew rate limiter configured to accept a parameter determined from the plurality of control signal levels and limit the rate of change of the first offset signal according to the parameter.

19. The multi-phase controller of claim 18, wherein the parameter is formed as a magnitude of a control signal vector determined from the plurality of control signal values.

20. The multi-phase controller of claim 18, wherein the slew rate limiter is configured to limit the rate of change of the first offset signal to a range between a first rate of change value and a second rate of change value.

21. The multi-phase controller of claim 18, wherein the rate of change of the first offset signal is a monotonic function of the parameter.

* * * * *